United States Patent [19]

Wolpert

[11] Patent Number: 5,021,160

[45] Date of Patent: Jun. 4, 1991

[54] STRONGLY ACIDIC MICROPOROUS MEMBRANES FOR CATION EXCHANGE

[75] Inventor: Stephen M. Wolpert, Detroit, Mich.

[73] Assignee: Gelman Sciences, Inc., Ann Arbor, Mich.

[21] Appl. No.: 462,261

[22] Filed: Jan. 9, 1990

[51] Int. Cl.$^5$ ............... B01D 53/22; B01D 71/68
[52] U.S. Cl. ............... 210/500.35; 55/158; 210/500.38; 210/500.41; 264/41
[58] Field of Search ............... 55/158; 210/500.35, 210/500.38, 500.41; 264/41; 525/328.2

[56] References Cited

U.S. PATENT DOCUMENTS

| | | | |
|---|---|---|---|
| 3,919,154 | 11/1975 | Chang et al. | 260/29.4 |
| 4,042,496 | 8/1977 | Tsushima et al. | 210/500.38 X |
| 4,377,481 | 3/1983 | Jakabhazy | 210/500.35 |
| 4,596,858 | 6/1986 | Gregor | 525/328.2 |
| 4,604,208 | 8/1986 | Chu et al. | 210/636 |
| 4,673,504 | 6/1987 | Ostreicher et al. | 210/500.38 X |
| 4,690,873 | 9/1987 | Makino et al. | 55/158 X |
| 4,704,324 | 11/1987 | Davis et al. | 210/500.35 X |
| 4,737,291 | 4/1988 | Barnes, Jr. et al. | 210/500.38 X |
| 4,758,348 | 7/1988 | Matsui et al. | 210/500.35 X |
| 4,839,203 | 6/1989 | Davis et al. | 210/500.41 X |
| 4,851,121 | 7/1989 | Yokota et al. | 210/500.41 X |
| 4,943,374 | 7/1990 | Heininger et al. | 210/500.41 X |

Primary Examiner—Robert Spitzer
Attorney, Agent, or Firm—Krass & Young

[57] ABSTRACT

Microporous filtration membranes are provided which are useful for absorbing or adsorbing cationic atoms, molecules or particles from liquids or gases. The invention also concerns novel strongly acidic copolymer solutions capable of crosslinking, and a process for preparing such solutions and making strongly acidic or anionic charge modified microporous filtration membranes therefrom. The copolymer of the solutions is synthesized from 2-acrylamido-2-methyl-1-propanesulfonic acid (AMPS) and either N-(isobutoxymethyl)acrylamide (IBMA) or 2-hydroxyethyl methacrylate (HEMA).

26 Claims, No Drawings

STRONGLY ACIDIC MICROPOROUS MEMBRANES FOR CATION EXCHANGE

FIELD OF THE INVENTION

This invention concerns microporous filtration membranes and, more particularly, strongly acidic or anionic charge modified microporous membranes which are useful for absorbing or adsorbing cationic atoms, molecules or particles from liquids or gases. The invention also concerns novel strongly acidic copolymer solutions capable of crosslinking, and a process for preparing such solutions and making strongly acidic or anionic charge modified microporous filtration membranes therefrom.

BACKGROUND OF THE INVENTION

Microporous membranes are well known in the particle filtration industry. The material of these membranes comprises suitable organic plastics such as nylons, acrylics, polyvinylidene fluoride, polysulfone, polyethersulfone, and the like. Their filtration mechanism is a combination of size exclusion (sieving) and absorption or adsorption on the walls of the pores inside the membrane. To be considered "microporous", the typical inner width of the pores is in the range between about 0.03 microns and about 10 microns. Below this range, are "ultrafiltration" (UF) membranes which serve to filter macromolecules rather than particles, or "reverse osmosis" (RO) membranes which serve to separate ions. The smaller the pore size, the slower the rate at which fluids can be passed. To be useful for a particular application, the flow rate of the membrane must therefore be reasonably high.

Microporous membranes may be supported with fibers to provide greater mechanical strength; these fibers may be either woven or nonwoven. Another type of microporous membrane consists of filter paper or depth filters; these are nonwoven webs of cellulose, plastic, glass, metal or other suitable fibers. For the purposes of this invention, the words "microporous membrane" are to be construed in the widest sense.

Cation exchange resins are part of a well known technology. The resins consist of small beads (e.g., 37 to 840 microns in diameter) of crosslinked polymer containing anionic functional groups such as sulfonic acids. The resins can be prepared by suspension polymerization of styrene and divinyl benzene followed by sulfonation. The finished resin beads in use are packed in a suitable column. They are used for many purposes. When water which contains dissolved salts is passed through the column, the cations are exchanged for hydrogen ions (on the sulfonic acid); thus the cations become absorbed on the resin. Carboxylic acids, iminodicarboxylates (which chelate cations), phosphonic acids, sulphates (which hydrolyze) are also useful for ion exchange but are less effective than sulfonic acids.

The uses of membranes vary widely but can be illustrated by one example where such use uniquely solves a practical problem in monitoring salts dissolved in water, e.g., solutes in distilled water used as coolants in nuclear power plants. Metal cations in the cooling water can cause pit corrosion on fuel rods or be transmuted to radioactive atoms; therefore the purity of this water must be monitored carefully.

Since distilled or deionized water has concentrations of cations too low to monitor directly, they are first concentrated by adsorption onto a cation exchanging membrane. Typically several hundred liters of feed water are filtered through a suitable membrane (or series of membranes). The water is often hot (140° F.) and the time for filtration long (typically three days).

The membranes are analyzed for their absorbed cations by some variation of the following procedure. The membranes are digested in hot concentrated sulfuric acid, then concentrated nitric acid, and diluted with deionized water to a clear solution which is then analyzed by atomic absorption or atomic emission spectroscopy. These spectroscopies require aspiration of the solution through a thin nozzle so for aspiration the solution should be free from undigested particles.

Considering this application, a suitable membrane should have the following qualities:

1. High content of strong acid functionality, preferably sulfonic. About 2 microequivalents per 47-mm diameter disc (10.7 square cm. effective surface area) is sufficient, more is preferable.

2. High water flow rate under the conditions of use (high pressure differential); this corresponds to roughly 100 seconds per 100 ml per one atmosphere pressure difference for a 47-mm diameter disc. Faster flow rates (less time to filter 100 ml) would be preferable.

3. Rapid ion exchange. As the water passes through the membrane, its dissolved cations should contact the active adsorbing sites rather than rush past them; this implies that the active sulfonic acid sites should be accessible, located on the membrane surface rather than deep in its interior.

4. Stability in hot water. Neither the base membrane nor its charge modifying materials should hydrolyze, dissolve, distort or deteriorate, nor should they contribute any extractable materials to the filtrate.

5. Low background levels of metal atoms in the membrane. These background metal atoms would interfere with subsequent chemical analysis.

6. Digestibility. The membrane components should dissolve during sulfuric/nitric acid digestion; polytetrafluoroethylene (Teflon), polypropylene, polyethylene, and certain other plastics do not dissolve.

7. Strength. The membrane should have sufficient mechanical strength and durability to withstand stresses from high pressure differences or rough handling.

Quite aside from ion exchange, strong acid membranes have other utilities, which utilize their shape (in the form of sheets or films) and the chemical reactivity of the acid group. One use is for the fabrication of a protective garment, e.g., a protective garment containing a strong acid membrane can be used to decompose and render harmless any of certain nerve gases in its passage through the garment. Another application involves treating the membrane with a solution of a silver salt (silver nitrate) wherein the silver atoms are absorbed (by ion exchange) in the membrane; hydrogen cyanide (gas or solution) passing through the membrane reacts with silver atoms to precipitate as insoluble, relatively harmless, silver cyanide solid. These examples illustrate how the chemical reactivity of the acid group, or of a metal atom bound to the acid group, can be utilized.

In more general terms, a strong acid membrane can be used for any of the various applications for which strong acid resin beads are now used. Membranes are often more convenient because the beads require packing inside a column whereas the membrane is self-supporting.

Strongly acidic, cation exchanging membranes are commercially available. For example, membranes called "Bio-Rex" (Bio-Rad Bulletin 1428, Bio-Rad Laboratories, Hercules, CA) are extremely flexible, strong ion exchange membranes composed of resin beads permanently enmeshed in a polytetrafluoroethylene (PTFE) membrane. A strong acid, cation exchanging membrane (Bio-Rex AG 50) contains 90% by weight of styrene/divinyl benzene, sulfonic acid, resin beads. The nominal ion exchange capacity of AG 50 is 2.63 meq per 47-mm disc.

The PTFE (Teflon) component of such membranes does not digest in sulfuric/nitric acids and so the utility of the membrane is limited. Teflon is not wettable by water so the membranes require an additional wetting agent, like Triton X-100 (or prewetting with methanol or other alcohol); these wetting agents then would need to be extracted before use or the membrane would contribute undesirable extractables to the filtrate.

Another membrane is a weak acid, chelating membrane (Chelex). The active sites are iminodiacetate sites which chelate divalent and trivalent metal cations (but not monovalent cations such as sodium, potassium, ammonium ions) and so the membrane has application more limited than the strong acid membranes.

Also available are ion exchange fibrous sheets (IONEX, Toray Industries, Inc. (Sonoyama, Otsu 520, Japan). These sheets are made of nonwoven filter paper and are not membranes. The Ionex fibers are composite fibers of polyethylene or polypropylene reinforcement dispersed as "islands in a sea of polystyrene." Fibers of polystyrene alone would be too brittle. The polystyrene phase is then chemically modified: sulfonation produces a strong acid fiber. The fibers are fabricated into a nonwoven web or paper. During sulfuric/nitric acid digestion, the polyolefin phase is not dissolved and can clog an aspirator in an AE or AA spectrophotometer. The fiber diameter is typically 40 microns which is small compared to beads but very large compared to a submicron membrane; although the total ion exchange capacity of the fibers is large, the rate of exchange may not be.

U.S. Pat. Nos. 4,012,303, 4,230,549, 4,339,473 (to Vincent F. D'Agostino and Joseph Y. Lee, assigned to the RAI Research Corp.) concern treating solid plastic films, not microporous membranes, by gamma irradiation of solutions of monomers (not preformed polymers) to effect grafting. These films, which are slightly conductive to electricity, are useful as separators in batteries or electrochemical cells.

European Patent Spec. 0 087 228 (assigned to Pall Corp., by Thomas C. Gsell, I.B. Joffee and J.P. Degan) describes how nylon microporous membranes can be prepared by the phase inversion method. This is not a post-treatment of a preformed membrane; the method involves the cocasting of a solution of nylon with another suitable polymer which provides the special surface properties, such as anionic charge. One example is nylon cocasted with polystyrene sulfonic acid (Versa TL, National Starch Co.). Other examples use polymers containing carboxylic acids, and polyethylene imine (PEI, a cationic polymer).

A patent concerning microporous membranes is U.S. Pat. No. 4,604,208 assigned to CUNO by Chaokang Chu, J.V. Fiore, R.A. Knight, P. Marinaccio and A. Roy, issued Aug. 5, 1986, entitled "LIQUID FILTRATION USING ANIONIC MICROPOROUS MEMBRANES." Patents concerning anionic RO and UF membranes are reviewed. The patent describes a process for anionically charge modifying a microporous organic polymer membrane by contacting it with a solution of a charge modifying agent. This agent is a polymer containing acidic functional groups such as sulfonic or carboxylic acids.

U.S. Pat. No. 4,596,858 to Harry P. Gregor, E. Samuelson, P.I. Dalven and C.D. Gregor describes cast films of poly-AMPS crosslinked with glycerol or other alcohols. Typical cure conditions are 140° C. for three hours. The cured, cast films are useful as RO or UF membranes.

U.S. Pat. No. 3,919,154 to Yun-Feng Chang, Mo-Fung Cheung, and Santokh S. Labana describes a paint whose resin is an acrylic interpolymer in which 2-acrylamido-2-methyl-1-propane sulfonic acid (AMPS) monomer is incorporated as a catalyst in a concentration of less than 1 percent. Hydroxypropyl methacrylate (at 15%) provides the hydroxyl functionality for subsequent crosslinking reaction with a separate melamine-formaldehyde (MF, aminoplast) resin.

OBJECTS AND SUMMARY OF THE INVENTION

It is an object to provide a novel strongly acidic copolymer solution capable of crosslinking and a process for preparing such a copolymer solution.

It is another object of this invention to provide a novel anionic charge modified microporous filter membrane, particularly suitable for the filtration of fluids, in particular, aqueous liquids including biological or parenteral liquids, and to further provide a process for making the novel membrane.

It is still another object to provide an improved ion exchange membrane.

It is another object to provide an improved membrane that is suitable for cation concentration and in particular for cation concentration in analytical chemistry procedures.

It is yet another object to provide an improved membrane useful specifically for cross flow filtration devices.

Another object is to provide a membrane in which the acid group or a cation bound to the acid group can be utilized to produce a chemical reaction.

It is another object of this invention to provide an isotropic anionic charge modified microporous filter membrane which has low extractables suitable for the filtration of fluids such as aqueous liquids including biological or parenteral liquids or for plasmapheresis.

It is yet another object of this invention to prepare a sanitizable or sterilizable anionically charge modified microporous membrane for the efficient removal of charged particulate contaminants from contaminated gases and liquids, particularly without the adsorption of desirable anionic constituents contained therein.

It is a further object of this invention to enhance the filtration performance of a preformed microporous membrane for charged particulate contaminants without substantially decreasing the pore size of the membrane.

It is a still further object of this invention to provide a microporous membrane capable of capturing charged particulate contaminants of a size smaller than the effective pore size of the membrane.

These and other objects of this invention are attained by a novel anionic charge modifying copolymer agent and by a novel hydrophilic anionic charge modified microporous filter membrane produced therefrom. The membrane comprises a hydrophilic organic polymeric microporous base membrane having a microstructure throughout the membrane and a charge modifying amount of the anionic charge modifying copolymer agent bonded to the membrane without substantial pore size reduction or pore blockage.

The invention is further directed to a process for anionically charge modifying a hydrophilic organic polymeric microporous base membrane by applying to the membrane the charge modifying copolymer agent. The membrane may be any of various suitable preformed organic polymeric microporous base membranes, which base membranes per se may be conventional. The resulting anionic charge modified microporous membrane is particularly useful for the filtration of fluids such as gases and liquids.

DETAILED DESCRIPTION OF THE INVENTION

The invention in one preferred aspect concerns a novel crosslinkable, acid copolymer. This copolymer is synthesized from a strong acid monomer which is an acrylamide alkane sulfonic acid monomer having the formula:

where R is hydrogen, lower alkyl, or phenyl;

R' is a methylene group or a lower alkyl, lower cycloalkyl, aromatic, or bivalent hydrocarbon group or other bridging group having its valence bonds on different carbon atoms; and X is H or sodium, ammonium, organic amine or other salt forming atom or compound, and a crosslinkable monomer having crosslinking functionality selected from 1) N-methylol-acrylamide alkoxyether compounds and 2) N-methylolacrylamide, hydroxyalkyl acrylates and hydroxyalkyl methacrylates that are crosslinkable by reaction with aminoplast resins, i.e., that undergo cationic, trans-etherification reaction by reaction with aminoplast resins.

In a preferred embodiment, for example, the copolymer is synthesized from about 1 to 2 parts of the monomer 2-acrylamido-2-methyl 1-propanesulfonic acid (AMPS) and 1 part of either 2-hydroxyethyl methacrylate (HEMA) or N-(isobutoxymethyl)acrylamide (IBMA). IBMA copolymers are self-crosslinking, i.e., they react with themselves. HEMA copolymers need a separate aminoplast resin crosslinking agent such as a melamine-formaldehyde (MF) resin. These types of crosslinking reactions, either IBMA with another IBMA or an MF resin with a hydroxyl group (such as provided by HEMA), are sometimes designated hereinafter as "aminoplast" crosslinking. Aminoplast crosslinking agents are sometimes called "aminoresins."

The crosslinking reaction for both types of copolymers is catalyzed by acid (provided by the sulfonic acid monomer) and inhibited by alcohols. An alcohol, preferably methanol, is used as a cosolvent during the polymerization (e.g., the AMPS-IBMA polymerization) to help prevent premature crosslinking (gelation).

The preferred strong acid monomer is the monomer AMPS which as the free sulfonic acid, as well as its sodium salt, is available from the Lubrizol Corp. The AMPS monomer, like acrylamide and other acrylic monomers, enters into copolymerizations to very high conversions. AMPS tends to hydrolyze less than some other N-substituted amides because of steric hindrance from the relatively bulky geminal dimethyl substituent. Other sulfonic acid derivatives of acrylamide or methacrylamide that are useful for purposes of the invention are 3-acrylamido-1-propanesulfonic acid, 3-acrylamido-3-butanesulfonic acid, 2-acrylamido-1-ethanesulfonic acid, 3-acrylamido-1-pentanesulfonic acid, and homologs and isomers of these monomers.

Monomers Having Hydroxyl-Crosslinking Functionality

The monomer preferred for providing hydroxyl-crosslinking functionality (as indicated above) is N-(isobutoxymethyl)acrylamide (IBMA), available from American Cyanamid Co. IBMA is dual functional. The acrylamide part is ethyleneically unsaturated and copolymerizes to high conversions with other unsaturated monomers, such as AMPS, by a free radical mechanism. The butoxymethyl ether part of the molecule (which is unaffected by polymerization) reacts by a cationic mechanism with hydroxyls, with another IBMA, or with other alkoxymethyl amides. This trans-etherification, cationic reaction is catalyzed by acids, such as AMPS. IBMA can be considered the isobutyl ether derivative of N-methylolacrylamide (abbreviated NMA). NMA by itself as well as other alkoxy derivatives of NMA (such as methoxy, ethoxy, propoxy, higher alkoxy and their isomers) also undergo cationic, trans-etherification reactions, similar to IBMA.

Monomers which contain hydroxyl-crosslinking functionality can be crosslinked by aminoplast resins which are post added separately. Aminoplast resins in general include the subgroups of melamine-formaldehyde (MF) resins, urea-formaldehyde resins, and the like, as well as polymers of IBMA. One example of an MF resin is hexamethoxymethyl melamine (HMMM) whose technical grades are commercially available from American Cyanamid Co. as the "Cymel" series of resins, such as Cymel 303 or Cymel 350. Some examples of monomers which contain hydroxyl-crosslinking functionality include: 2-hydroxyethyl methacrylate (HEMA) which is preferred, available commercially from Rohm & Hass Co.; 2-hydroxyethyl acrylate; 2-hydroxypropyl methacrylate and acrylate; 3-hydroxypropyl methacrylate and acrylate; and the like. Also, vinyl acetate may be hydrolyzed after copolymerization to introduce hydroxyl-crosslinking functionality.

Amount of Crosslinkable Monomer

The amount of crosslinkable monomer (IBMA or HEMA, for example) in the copolymer is such (i.e., high enough) that the crosslinked network in the resulting copolymer is strong and water resistant after drying. Without any crosslinking, the AMPS homopolymer dissolves in water. With only light crosslinking, water swells the copolymer to a weak hydrogel. This hydrogel may clog the membrane pores. Furthermore, it would be mechanically weak, would disintegrate in water and the pieces would either clog the pores or be extracted out of the membrane and lost. Too tight a crosslink density, on the other hand, would embrittle the network, also causing it to disintegrate when exposed to water. Furthermore, the higher the proportion of crosslinkable monomer, the lower the proportion of the cation exchanging monomer. To produce relatively tough, strong films, the optimum crosslink density ranges between about 8 and 55 percent by weight of crosslinking comonomer, and more preferably between 20 and 50 percent.

Polymerization Conditions

High molecular weight in the copolymer is not desirable because it thickens the post-treatment solution excessively.

Monomers: The monomers (e.g., the strong acid monomer AMPS, and the crosslinkable monomer IBMA or HEMA) may be used as supplied without further purification. The concentration of monomers in the total reaction mixture should be between about 4 and 17% by weight and more preferably between 9 and 14%. Above this range, solutions of even relatively low molecular weight polymers become too viscous to handle. Below this range, the volume of solution required is inconveniently large.

Solvents: The choice of solvent is not critical as long as it dissolves the monomers, additives and the final copolymer. The term "water" means deionized water and filtered water. AMPS is very soluble in water and dimethylformamide, moderately soluble in methanol, and less soluble in other lower alcohols. IBMA is very soluble in alcohols but less so in water. HEMA monomer is soluble in pure water but its copolymers tend to gel when water is the only solvent. In general, the preferred solvent is a blend of water and methanol in roughly equal proportions, between 1:2 and 2:1 approximately.

Methanol is more than just a cosolvent. It is also a chain transfer agent and an inhibitor for the IBMA self-condensation reaction.

Initiator: The choice is not critical and many well known, water or alcohol soluble initiators are available. A preferred initiator is ammonium persulfate (also called ammonium peroxodisulfate). Potassium persulfate is also useful, but one would prefer not to introduce alkali metal cations for the purposes of this invention.

The concentration of initiator is not particularly critical. A few tenths of one percent by weight of the entire solution is appropriate, from 0.02% to 0.7% and preferably 0.1% to 0.4%. Sodium meta-bisulfite may also be added as an activator at a concentration of between 40% and 75% by weight of the ammonium persulfate. Higher concentrations tend to cause faster polymerization but lower molecular weight.

Chain Transfer Agent: Chain transfer agents, which limit the polymer's size and solution viscosity, are well known. Mercaptans are particularly effective. Alcohols are preferred because of their other uses as solvents and inhibitors of IBMA self-condensation; they are preferred in a blend with water. Brominated organic compounds are highly preferred as a class and, in particular, carbon tetrabromide, and 2, 3-dibromo-1-propanol are preferred.

Temperature: Ambient temperature, approximately 25° C., is sufficient for complete reaction within one day. Higher temperatures allow faster reaction times (less than one hour) and also cause lower molecular weight (which is desirable for the purposes of this invention). The temperature is not critical but should be between about 20° to 75° C.

Oxygen should be purged or excluded from the reaction system by flushing with nitrogen (preferred) or other inert gas. The time required for purging is generally between five minutes and one hour.

The most convenient procedure is to combine and dissolve the above components in a sealable bottle, purge with nitrogen, and allow to react overnight at ambient temperature, near 25° C. A variation of this procedure is to warm the bottle in an oven for a short period to commence the polymerization and then let it cool to ambient temperature to complete the polymerization.

The resulting copolymer solution can, according to the invention, be used as a post-treatment solution (e.g., after suitable dilution) for treating a microporous uncharged base membrane to make it into a novel anionic charge modified microporous filter membrane that is suitable for the filtration of fluids to remove cationic atoms, molecules or particles from said fluids.

The Base Membrane

The invention contemplates for treatment any of a wide variety of supported or unsupported microporous uncharged base membranes. Polyethersulfone base membranes are preferred.

Treatment of the Base Membrane

For the treatment of the base membrane, the copolymer solution is first diluted to an appropriate concentration, for convenience expressed herein as weight of active copolymer in the final treatment solution. It is not necessary to first isolate the copolymer from its polymerization medium. The higher the amount of copolymer, the greater the ion exchange capacity. On the other hand, the higher the copolymer concentration, the more viscous the post-treatment solution, and the more it tends to coat the outside of the membrane with a relatively nonporous skin, and the more it tends to clog the inside of the membrane's pores. The optimum depends on the particular circumstances and is determined on an individual basis by simple experiment. Generally, a resin concentration between about 0.2 to about 9% is suitable. Preferably, the resin concentration is between 0.8 and 6%.

The solvent for this dilution can be water (highly preferred), alcohols, other organic solvents, and their blends. The solvent system should include only those solvents that are compatible with the base membrane. Dimethylformamide (DMF), which dissolves many kinds of base membranes, can nevertheless be used along with water (as described, for example, in Example 8 which follows), but since water tends to evaporate first, leaving behind some DMF, the base membrane can be affected. Generally, organic solvents other than the lower alcohols are less preferred.

Lower alcohols are preferred solvents because they inhibit or retard the aminoplast reaction until they evaporate. Methanol, having the lowest molecular weight and therefore the highest concentration of hydroxyls, is highly preferred. Ethanol is also highly preferred because it has almost as high a concentration of hydroxyls as methanol but is less toxic.

Contacting the Base Membrane

The base membrane is contacted with the post-treatment solution so that the solution fills the internal pores of the membrane. This is most conveniently done by dipping the membrane into a suitable tray containing the solution. A set of rollers to guide the membrane, keep it submerged, and (optionally) wipe off excess solution is useful. Other methods, such as roller coating, reverse roller coating, curtaining, doctor blading, and the like, can also be used.

Baking

The wet membrane is then baked in a suitable oven that is vented properly. The copolymer remaining after solvent removal then crosslinks or cures during continued baking.

The two baking steps of evaporation and curing can be accomplished in one single oven, or in two separate ovens, or in one two-stage oven. The temperature for the evaporation stage is not critical and depends on air circulation. The temperature required for the crosslinking step depends on time but generally should be above 85° C. and below the temperature at which the base membrane might distort, about 180° C. Convenient bake time is generally between about 2 minutes and 35 minutes, and more preferably about 10 to 20 minutes. In order to obtain a proper cure within 10 to 20 minutes, the bake temperatures should be between approximately 90° and 140° C., and more preferably between 105° to 130° C.

Testing

To evaluate the utility of representative membranes of the invention, test methods described in what follows were employed. Samples of membranes were usually tested in the form of 47-mm diameter discs which were cut out from a membrane sheet using a die.

Water Flow Rate (WFR)

This test determines the time, in seconds, required to vacuum filter 100 ml of prefiltered, pure water through a 47-mm disc. A disc is clamped in a suitable fixture (such as Gelman Sciences Product #4201 magnetic filter funnel) which is connected through a solenoid valve to a vacuum source set at 25 inch Hg vacuum. A switch activates this solenoid valve and also activates an electric timer. The time required to filter 100 ml of water is measured. A lower numerical value means faster flow and is generally desired in a useful membrane.

Sometimes a post-treated membrane may be sensitive to water such that its properties might change over time. This sensitivity is usually undesirable in a useful membrane. In particular, it would be undesirable if the flow rate decreased after exposure to water. To detect such water sensitivity, an accelerated aging test was performed on experimental membranes. In one test, discs were soaked in water overnight at either ambient temperature (25° C.) or at 55° C. In another test of accelerated aging, discs were boiled for half an hour in water. Then the WFR test was performed with 100 ml water at ambient temperature.

Water Bubble Point (WBP)

This test is described in ASTM F-316, and in Chapter 4.2 of the book "Membrane Filtration" by Thomas D. Brock (Science Tech, Inc., Madison, WI, 1983). In this test, a membrane sample is prewet with pure water, clamped horizontally in a fixture which provides a thin reservoir of water above the membrane and has a source of compressed air below it. The pressure, in psi, required to expel the water from the pores of the membrane (overcoming its capillary forces) is a measure of the diameter inside the membranes pores; smaller pores have greater capillarity and require higher pressures. The pressure at which bubbles are observed in the water reservoir is called the bubble point. Actually, one observes a range of pressures, not a single point, because membranes have a range of pore sizes. The initial BP (at lower pressure) is observed to come from one (or a few) specific locations in a sample and characterizes the largest few pores. At a slightly higher pressure, one observes an effervescent, champagne-like bubbling which is uniformly distributed over the sample. This is the Foam All Over Point and indicates the most typical pore sizes. Usually both values are reported as a range. The more uniform the pore distribution within a membrane, the narrower the BP range.

Although the WBP is related to pore size and pore size is related to water flow rate, it is not necessarily true that WBP is any indicator of flow rate. If most, but not all, of the pores in a membrane were completely clogged by a post-treatment, the WBP might hardly be affected but the WFR would become almost nil.

Methylene Blue Dye Capacity (MB)

Methylene Blue is a cationic (basic) dye and so is tightly absorbed on anionic (acidic) surfaces. The quantity of dye absorbed indicates the quantity of anionic charge available on a membrane. Experimentally, a 47-mm disc is clamped in a suitable funnel connected to a vacuum source (usually at 15 inch Hg vacuum). Measured volumes of a 10 ppm (parts per million or mg/L) aqueous solution of Methylene Blue is vacuum filtered through the disc. At first, all the dye is absorbed on the disc and the filtrate appears colorless. When the capacity of the membrane starts to become exhausted, the filtrate appears pale blue; this is the endpoint. The volume, in milliliters, of solution passed at the endpoint is recorded.

This endpoint volume can be converted to units of charge, in micro-equivalents per 47-mm disc, using the molecular weight of methylene blue as 374 daltons: 1 ml of 10 ppm solution corresponds to 0.0267 micro-equivalents.

Salt Splitting (SS)

This is a test of total charge capacity by titration. The version used here is an adaption of an old method used for ion exchange beads. Ten 47-mm discs are rinsed with water to remove any residual unattached resin and then soaked in 0.1 N NaOH in 5 wt percent NaCl solution for between 2 and 24 hours. The acid groups in the membrane "split" the salt and release HCl which neutralizes some of the NaOH. (Neutralization of the NaOH by the membrane's acidity would occur even without the high concentration of added salt but at a much slower rate; complete equilibration would be uncertain.) Aliquots of this partially neutralized saline NaOH solution are then back titrated with standardized 0.1000 N HCl to a phenolphthalein endpoint. Blanks are also run: this being the same procedure but without discs. The anionic charge capacity is calculated and reported as micro-equivalents per one disc.

Methylene Blue vs. Salt Splitting Tests

Both the MB and SS procedures measure the ion exchange capacity or charge level on membranes. Numerically, the SS test gives higher values. One reason is that the effective surface areas are different; the MB procedure clamps a disc in a fixture which excludes the outer 5 mm, about 61 percent of the disc's area, whereas the SS methods tests the entire disc. More importantly however, the SS method allows time for complete equilibration whereas the MB is dynamic: little time is allowed for absorption of the dye molecules as the solution rushes through the pores.

This dynamic aspect of the MB procedure makes it a more realistic test for actual end use conditions.

Metal Analysis

The background level of accidental metal contamination was determined. Three 47-mm discs at a time were digested in 10 ml hot concentrated sulfuric acid, then 3 ml of cold concentrated nitric acid and the charred mass dissolved in water to a final volume of 100 ml, which was analyzed by the direct current plasma variation of atomic emission spectroscopy against calibration standards. Results were provided as ppb (micrograms/liter) of various cations in this 100 ml volume. These numbers were divided by three to obtain values per one disc. The background levels were judged to be acceptably low.

The invention and the best mode of practicing the same are illustrated by the following examples of preferred embodiments of the invention.

EXAMPLE 1

IBMA-AMPS Copolymer Synthesis

The following components were dissolved in a one-liter, screw cap, glass bottle, in this order.

| Component | Grams | Percent |
| --- | --- | --- |
| AMPS (Acid Monomer) | 72.0 | 8.0 |
| Ammonium Persulfate (Initiator) | 2.7 | 0.3 |
| Sodium Meta-bisulfite (Activator) | 1.8 | 0.2 |
| Water (Cosolvent) | 337.5 | 37.5 |
| Methanol (Cosolvent, Chain Transfer Agent, Inhibitor) | 436.5 | 48.5 |
| IBMA (Crosslinkable Monomer) | 36.0 | 4.0 |
| 2,3-Dibromo-1-propanol (Chain Transfer Agent) | 13.5 | 1.5 |
| TOTAL | 900.0 | 100.0 |

The bottle was purged with nitrogen for 50 minutes, sealed, placed in a 70° C. air oven for 40 minutes, removed and allowed to post-react overnight. The charge of monomers was 12% by weight. The resulting copolymer solution can be used as (and is a preferred example of) a novel post-treatment solution (e.g., after suitable dilution) for treating a microporous base membrane to make it into a novel anionic charge modified microporous filter membrane that is suitable for the filtration of fluids to remove cationic atoms, molecules, or particles from said fluids. The final viscosity of the solution was moderate.

In place of AMPS in the copolymer synthesis one can use an equivalent amount of 3-acrylamido-1-propane sulfonic acid, 3-acrylamido-3-butane sulfonic acid, 2-acrylamido-1-ethane sulfonic acid, 3-acrylamido-1-pentane sulfonic acid, or the like.

EXAMPLE 2

Post-Treatment of a Pes Membrane

A post-treatment formulation was prepared by diluting the Example 1 solution from 12% to 4% with water. Base membrane "D" is an unsupported, microporous membrane rated as 0.45 micron pore size, prepared from a casting solution of polyethersulfone. The process is fully described in pending U.S. Pat. No. 4,900,449. The WFR of the resulting membrane was about 12 to 14 seconds; the WBP was about 35 to 39 psi.

A roll of the untreated base membrane "D" was dipped into the post-treatment solution contained in a suitable dip tray and the excess liquid was removed by passing through rollers. The wet membrane was dried in a circulating air oven at a temperature between 97° and 100° C. The line speed through the oven was set to provide a residence time of 16 minutes. Then the dry membrane was cured for an additional 12 minutes between 126° and 130° C.

EXAMPLE 3

Post-Treatment of Membrane "A"

Membrane "A" is a polysulfone, microporous membrane supported on a polyester nonwoven web, with 0.45 micron rating. Typically, WFR=12 sec.; WBP=32 to 36 psi.

It was post-treated by exactly the same process as in Example 2.

EXAMPLE 4

Membrane Comparative Evaluation

Table 1 shows test data comparing Examples 2 and 3 with a conventional strong acid membrane manufactured from resin beads (available from Gelman Sciences, Ann Arbor, Michigan, as one of a series of strong acid membranes (SA). This table demonstrates the utility of the invention. The data in each case refer to a single 47-mm diameter disc.

TABLE 1.

| Test | Relative Performance Characteristics | | |
| --- | --- | --- | --- |
| | Ex. 2 | Ex. 3 | SA |
| Mass, milligrams | 80.6 | 149.2 | 115.3 |
| Ion exchange capacity | | | |
| Salt Splitting, micro-eqv | | | |
| per disc | 38.0 | 32.0 | 47.0 |
| per milligram | 0.47 | 0.21 | 0.40 |
| MB Dye, ml of 10 ppm solution | | | |
| initial | 400.0 | 130.0 | 3.0 |
| boiled 30 minutes | 325.0 | 130.0 | 1.5 |
| soaked 55° C., 16 hr | 670.0 | 225.0 | — |
| MB Dye, micro-eqv | | | |
| initial | 10.7 | 3.5 | 0.08 |
| boiled 30 minutes | 8.7 | 3.5 | 0.04 |
| Water flow rate, sec per 100 ml | | | |
| initial | 21.0 | 19.0 | 34.0 |
| boiled 30 minutes | 100.0 | 29.0 | 21.0 |
| Metal Content, ppb | | | |
| Iron | 25.0 | 25.0 | 50.0 |
| Zinc | 12.0 | 7.0 | 17.0 |
| Nickel | 13.0 | 13.0 | 17.0 |
| Chrome | 13.0 | 13.0 | 17.0 |
| Copper | 0 | 0 | 0 |

These results show that the ion exchange capacity of each of the anionically charged membranes, as measured by the Methylene Blue dye absorption test, is at least 130 times greater than that of the conventional strong acid (SA) membrane.

However, the ion exchange capacity as measured by salt splitting, is not significantly different whether compared on a per disc basis or on a per mass basis. Since the MB method more realistically simulates ion exchange capacity under actual conditions of use (not allowing time for diffusion or equilibration) the MB method is more significant.

The results also show that when the anionically charged membranes are exposed to water, and especially hot or boiling water, their water flow rate decreases (longer time required) relative to the initial rate.

EXAMPLE 5

Another copolymer was synthesized using the procedure according to Example 1, but here the dibromopropanol (a chain transfer agent) was omitted, as follows:

| Component | Grams | Percent |
|---|---|---|
| AMPS | 45.0 | 9.0 |
| Ammonium Persulfate | 1.75 | 0.35 |
| Sodium Meta-bisulfite | 0.75 | 0.15 |
| Water | 258.0 | 51.6 |
| IBMA | 22.5 | 4.5 |
| Methanol | 172.0 | 34.4 |
| TOTAL | 500.0 | 100.0 |

The solution was flushed with nitrogen and allowed to polymerize at ambient room temperature (25° C.) overnight (16 hours). The copolymer solution was very viscous, barely pourable.

A post-treatment solution was prepared by diluting this 13.5% solution to 0.80% with an 11.7% solution of methanol in water. The post-treatment solution was more dilute than Example 2 (0.8 vs 4.0%) because the polymer had higher molecular weight and its more concentrated solutions were too viscous for convenient application.

Five representative base membranes were chosen for post-treatment including the two mentioned above. They are described and tabulated below according to the plastic from which the active membrane is manufactured, the material of a nonwoven web (if any) used for mechanical support, and the nominal pore size rating in microns.

Also tabulated are the water flow rate (WFR) in sec per 100 ml water, and the water bubble points (WBP) in psi. These data were taken both initially and after boiling the base membrane in water for 30 minutes. The range for water bubble points refers to the initial BP (first few bubbles) and the foam all over BP (champagne effervescence). This range is small because the distribution of pore sizes within each membrane is usually narrow.

| DESCRIPTION OF UNTREATED BASE MEMBRANES | | | |
|---|---|---|---|
| ID | Plastic | Support | Microns |
| A | Polysulfone on | Polyester | 0.45 |
| B | Polyethersulfone on | Polyester | 0.45 |
| C | Polyethersulfone on | Polypropylene | 0.45 |
| D | Polyethersulfone | Unsupported | 0.45 |
| E | Polyethersulfone | Unsupported | 0.2 |

| Base Membrane | A | B | C | D | E |
|---|---|---|---|---|---|
| WFR, sec | | | | | |
| initial | 12.6 | 11 to 13 | 11.2 | 12.5 | 21.4 |
| boiled 30 min | 12.3 | | 10.0 | 12.3 | 17.6 |
| WBP Range, psi | | | | | |
| initial | 34–37 | 32 to 39 | 35–38 | 38–40 | 49–51 |
| boiled 30 min | 32–34 | — | 36–38 | 36–39 | 52–53 |

For these untreated base membranes, the results show that the properties did not change after boiling by more than could be expected, allowing for experimental error and randomness of sampling.

Rolls of five untreated membranes (A to E as above) were post-treated by the dip and bake process described in Example 2. The line speed was adjusted to provide a residence time of 20 minutes at about 65° to 75° C. This low temperature is an underbake. Their performance parameters are tabulated as follows.

| POST-TREATED ANIONICALLY CHARGED MEMBRANES, UNDERCURED | | | | | |
|---|---|---|---|---|---|
| Base Membrane | A | B | C | D | E |
| Water Flow Rates, sec | | | | | |
| initial | 19 | 18 | 13 | 19 | 32 |
| boiled 30 min | 273 | 57 | 70 | 184 | 941 |
| Methylene Blue Dye, ml | | | | | |
| initial | 35 | 35 | 50 | 70 | 75 |
| boiled 30 min | 20 | 30 | 35 | 60 | 50 |
| Water Bubble Point, psi | | | | | |
| initial | 31–33 | 45–48 | 37–39 | 34–35 | 54–55 |
| boiled | 32–34 | 41–43 | 41–43 | 39–44 | 54–55 |

These results (showing the significant absorption of MB dye) demonstrate that the membranes were indeed anionically charged. The examples illustrate the applicability of this invention to supported, as well as to unsupported, membranes.

The results show that compared to Examples 2 and 3, the examples have lower dye absorption. This is due to the fact that the treatment solution was more dilute.

The initial water flow rates were not much different from those of the untreated base membranes. However, after exposure to hot water, the flow rate decreases to impracticably low values. Apparently, the lightly cross-linked gel expanded inside the pores and clogged them.

The water bubble points, initial vs boiled, were not much changed, however. This demonstrates that bubble points alone are not good indicators of water flow rates or of pore clogging.

The charge capacity after boiling also decreases slightly; this suggests that some of the treatment material may have been extracted.

EXAMPLE 6

Samples of the five post-treated membranes in Example 5 were further baked in a lab oven at 130° C. for 60 minutes. Results:

| POST-TREATED CHARGED MEMBRANES, COMPLETELY CURED | | | | | |
|---|---|---|---|---|---|
| Base Membrane | A | B | C | D | E |
| Water Flow Rates, sec | | | | | |
| initial | 18 | 18 | 23 | 18 | 27 |
| boiled 30 min | 20 | 21 | 17 | 31 | 45 |
| Methylene Blue Dye, ml | | | | | |
| initial | 30 | 40 | 35 | 70 | 75 |
| boiled 30 min | 35 | 35 | 35 | 75 | 80 |
| Water Bubble Point, psi | | | | | |
| initial | 36–38 | 45–47 | 41–43 | 34–36 | 56–57 |
| boiled | 29–31 | 41–43 | — | 35–39 | 55–56 |

These data demonstrate that when sufficiently cured, the performance properties of the membranes do not change significantly even after exposure to boiling water, in contrast to the results from Example 5 which was an undercure. A cure at 130° C. for one hour is sufficient but shorter times and lower temperatures are also acceptable.

Comparing Examples 6 with 5, it is also noted that for the same base membrane, the initial values do not differ significantly. After boiling, however, a drastic difference is observed: the water flow rate is much faster when sufficiently cured than when undercured.

The polyethersulfone membrane rated as 0.2 microns did not show an ion exchange capacity significantly greater than that rated as 0.45 microns.

EXAMPLE 7

Two of the five rolls from Example 5, rolls A and D, were continuously processed through a curing oven at a rate adjusted to provide a residence time of 14 minutes. The temperature for A was between 110° and 119° C.; for D between 121° and 123° C. Results:

| Base Membrane | A | D |
|---|---|---|
| Water Flow Rate, sec | | |
| initial | 16 | 14 |
| boiled | 25 | 26 |
| MB Dye Capacity | | |
| initial | 35 | 75 |
| boiled | 40 | 80 |
| Salt Splitting, Micro-Eqv Ion Exchange capacity by titration | 9 | 7 |

These data demonstrate that proper curing conditions are approximately 14 minutes between 110° and 123° C.

EXAMPLE 8

This example illustrates a copolymerization in which dimethyl formamide (DMF) is part of the solvent system; although DMF is a good solvent for polysulfones and polyethersulfones, DMF can safely be used as a component in post-treatment formulations.

Water was not needed as a solvent; ethanol and DMF were sufficient. The monomer charge was higher than previously, 15%. No chain transfer agent was required to obtain suitably low molecular weights when water was not the primary solvent. Benzoyl peroxide, an initiator soluble in organic solvents, was used instead of persulfate.

| Component | Wt % | Grams |
|---|---|---|
| AMPS | 10.0 | 12.0 |
| IBMA | 5.0 | 6.0 |
| Dimethyl formamide | 69.6 | 83.5 |
| Ethanol | 15.0 | 18.0 |
| Benzoyl peroxide | 0.4 | 0.5 |
| TOTAL | 100.0% | 120.0 grams |

The above components were dissolved inside a sealable glass bottle, flushed with nitrogen, sealed and placed in a vented oven at 72° C. overnight (17 hours). The resulting slightly yellow polymer solution had an appropriately low viscosity.

A tough, coherent film resulted when this solution was cast in a Petri dish and cured at 110° C. for one hour. After immersion under water, this film remained substantially coherent but did disintegrate partially.

Two post-treatment formulations were prepared by diluting the 15% copolymer solution to either 2.5% or to 1.5% with water. A polyester supported polyethersulfone membrane rated as 0.45 microns (same as Example 5B) was dip treated and cured at 109° C. for 36 minutes.

The membrane post-treated with 1.5% solution, had an average initial water flow rate of 23 seconds and absorbed over 50 ml of methylene blue dye; thus it showed a useful flow rate and charge level. However, it seemed to be attacked in a few spots by the DMF solvent. The base membrane treated with the more concentrated solution, 2.5% copolymer, was partially but definitely attacked by DMF.

EXAMPLE 9

Into a resin kettle equipped with stirrer, condenser, thermometer, heating mantle, and nitrogen sparge, were combined:

| Component | Wt % | Grams |
|---|---|---|
| Water | 58.8 | 400.0 |
| AMPS | 5.9 | 40.0 |
| HEMA | 5.9 | 40.0 |
| Isopropanol | 29.4 | 200.0 |
| Ammonium persulfate | 0.06 | 0.4 |
| Sodium meta-bisulfite | 0.03 | 0.2 |
| TOTAL | 100.0% | 680.6 grams |

Previous experiments had shown that without an alcohol, such as isopropanol, the copolymer solution tends to gel; although the monomers are water soluble, the copolymer is less so.

The temperature was slowly increased from 25° to 47° C. at which point the exothermic polymerization caused a rapid temperature rise to 77° C. The temperature was maintained at 76° to 78° C. for another 3.5 hours during which an additional few tenths of a gram of persulfate and meta-bisulfite were added to help insure complete conversion of the monomers. The resulting copolymer had an appropriately low viscosity.

EXAMPLES 10 TO 12

The Example 9 copolymer solution is based on 2-hydroxyethyl methacrylate (HEMA) which does not generally self-condense under the curing conditions described here. Therefore, in Examples 10 to 12, an external crosslinking agent was used: Cymel 350 which is a commercial, water soluble, aminoplast resin corresponding approximately to hexamethoxymethyl melamine (HMMM). It is almost identical to Cymel 303 but is more water soluble. Its equivalent weight is generally considered to be between 130 and 190 (depending on particular cure conditions) and may be taken as approximately 160 grams per equivalent. In place of HEMA for the copolymer solution in Example 9, one can use an equivalent amount of 2-hydroxypropyl or 3-hydroxypropyl methacrylate or 2-hydroxyethyl, 2-hydroxypropyl or 3-hydroxypropyl acrylate.

Three post-treatment formulations were prepared by diluting the example 9 solution from 11.8% to 3.75% with an aqueous methanol solution (40% by volume methanol). Cymel-350 was added at 0.2, 0.4 or 0.6 parts by weight per one part of copolymer in the treatment solution. (These weight ratios correspond to chemically stoichiometric ratios of approximately 33%, 66% and 100% of methoxy ether per hydroxyl on the HEMA copolymer.)

Polypropylene supported, 0.45 micron rated polyethersulfone microporous membranes (the same as that in Example 5C) were post-treated with the three above solutions by dipping and then curing for 30 minutes in an oven between 105° to 110° C. Results:

|  | Example No. | | |
| --- | --- | --- | --- |
|  | 10 | 11 | 12 |
| Parts Cymel 350 per part copolymer | 0.2 | 0.4 | 0.6 |
| Water Flow Rate, sec per 100 ml | | | |
| Initial | 12 | 13 | 13 |
| Soaked in water 25° C., 18 hours | 200+ | 41 | 16 |
| Boiled in water 3 minutes | — | 465 | 198 |
| Methylene Blue Dye Capacity ml of 10 ppm solution, no prior soak | — | — | 33 |

These three examples demonstrate the utility of an external crosslinking agent. The resistance to hot water or to long term exposure (overnight) to cold water increases with increasing crosslinking density. However, the membrane post-treated with even low proportions of crosslinking agent still has some utility.

EXAMPLES 13 TO 16

A series of four copolymers was synthesized with differing ratios of HEMA to AMPS: the fractions of HEMA in the copolymer were 20, 30, 40 or 50% by weight. The concentration of combined monomers (or copolymer) was 9%. The solvent was a 1:2 blend of isopropanol and water. Initiators were 0.2% ammonium persulfate and 0.1% sodium meta-bisulfite. The four preparations were reacted overnight at ambient temperature and then for one hour at 80° C. The viscosity in each case was moderate.

Four post-treatment solutions were prepared by diluting the above to 1.5% copolymer with a 2:3 blend of methanol and water. For each of the four solutions, the equivalents of hydroxyl from HEMA was calculated and the stoichiometric amount of Cymel 350 aminoplast resin was added. For this calculation, the equivalent weights were taken as 160 for Cymel and 130 for HEMA.

Sheets of base membrane, polyethersulfone supported on polypropylene, 0.45 micron rated, were post-treated with each of the four solutions and cured for half an hour between 97° and 111° C. Water flow rates were determined on 47-mm discs under three conditions: initial, repeat on same disc which constitutes a flush and brief soak in 25° C. water, and after soaking half an hour in 55° C. water.

In order to observe the behavior of the polymer network without any membrane, the post-treatment solutions were poured into glass Petri dishes and baked in a circulating air oven at 92° C for over one hour and then 105° C. for another hour. Water was dropped on the cured, thin films to produce a highly swollen hydrogel which was examined for its mechanical integrity. Results:

|  | Example No. | | | |
| --- | --- | --- | --- | --- |
|  | 13 | 14 | 15 | 16 |
| Percent HEMA in Copolymer | 20% | 30% | 40% | 50% |
| Water Flow Rate, Sec per 100 ml | | | | |
| Initial | 41 | 15 | 11.1 | 11.2 |
| Repeat on same disc | 100 | 14 | 10.5 | 11.6 |
| Soaked 55° C., half hour | No Flow | 200 | 18 | 14 |
| Hydrogel Appearance Mechanical Stability | Disintegrated | Disintegrated | Coherent | Coherent |

Those cast films with lower HEMA content, and therefore lower crosslink density, disintegrated but those with higher HEMA remained coherent although weak. This phenomenon explains why the flow rates are so slow with inadequate crosslinking density: the cured network disintegrates on exposure to water, especially hot water, and the pieces of swollen hydrogel then clog the membrane's pores.

EXAMPLE 17

A homopolymer of AMPS was synthesized by combining the following components in a bottle and allowing it to polymerize overnight at 25° C.: 12.5% AMPS, 55% water, 31.5% methanol, 0.58% dibromo-propanol, 0.25% ammonium persulfate, 0.17% sodium metabisulfite, and a nitrogen flush. The resulting polymer solution was very viscous. A post-treatment formulation was prepared by diluting the 12.5% polyAMPS solution to 4.0% with aqueous methanol (25% methanol).

EXAMPLES 18 TO 21

Four membranes were chosen for post-treatment, three already described in Example 5. The fourth was an unsupported nylon rated 0.45 microns, WFR=26 sec, WBP=45–46 psi, MB Dye Capacity, less than 1 ml. All were dip treated in the Example 17 solution and baked 22 minutes between 115° and 119° C.

Discs were cut out and soaked in a covered jar of hot water (55° C.) overnight (16 hours) and then tested for WFR and MB Capacity. At the same time, the two membranes described as Examples 2 and 3 were also tested for comparison. The results are reported below (and also tabulated in comparative Example 4).

|  | Example No. | | | | | |
| --- | --- | --- | --- | --- | --- | --- |
|  | 18 | 19 | 20 | 21 | 2 | 3 |
| Base Membrane | A | B | Nylon | E | D | A |
| Membrane Material | PS | PES | Nylon | PS | PES | PS |
| Support Material | PE | None | None | None | None | PE |
| Rating, microns | 0.45 | 0.45 | 0.45 | 0.2 | 0.45 | 0.45 |
| Soaked 55° C., 16 hr. | | | | | | |
| Water Flow Rate, sec. | 320 | 41 | No Flow | 69 | 24 | 20 |
| MB Capacity | 5 | 10 | No Flow | 7 | 670 | 225 |

These data show that without any crosslinking, a sulfonic acid containing polymer is marginally useful. The polymer swells and clogs the pores. Furthermore, the dye capacity test seems to indicate that most of the sulfonic acid polymer had been leached out and was no longer available as an effective post-treatment. The properly crosslinked material, Examples 2 and 3, in contrast, have excellent flow and excellent charge capacity.

EXAMPLES 22 to 25

The same four base membranes used in Examples 18 to 21 were again post-treated with the same post-treatment solution based on the homopolymer of AMPS described in Example 17. However, in these examples an aminoplast crosslinking agent was added, Cymel 303. Those skilled in the art would not expect an aminoplast resin to react with sulfonic acids under the conditions described here; no crosslinking would be expected. Aminoplast resins are well known to react rapidly with hydroxyls (including N-methylol derivatives) and alkoxy ethers of N-methylol amides; and less rapidly with amides and carboxylic acids, but not with sulfonic acids or sulfonates or sulfates.

Per 100 g of the 4% post-treatment solution of Example 17 (containing 4 g as polyAMPS) was added 1.2 g (30 parts per hundred ratio, phr) of Cymel 303 aminoplast resin. The four membranes were post-treated and baked as described in Examples 18 to 21. (Because the flow rates were so slow, the actual volume used in the WFR test was 10 ml and then the values multiplied by 10 to present the data in comparable units.) Results:

|  | Example No. | | | |
| --- | --- | --- | --- | --- |
|  | 22 | 23 | 24 | 25 |
| Base Membrane | A | D | N Nylon | E |
| Soaked 55°, 16 hr. | | | | |
| WFR, sec per 100 ml | 690 | 500 | No Flow | No Flow |
| MB Dye Capacity, ml | 7 | 4 | No Flow | No Flow |

These data demonstrate that merely adding an aminoplast resin to a sulfonic acid polymer does not produce the beneficial effects to be expected from crosslinking, i.e., fast flow rate and permanently high charge capacity were not achieved.

EXAMPLES 26 TO 28

These examples illustrate a failure to obtain useful results using a homopolymer, poly(styrene sulfonic acid), PSSA. PSSA is commercially available from National Starch and Chemical Co. as an 8% solution in water called "Versa-TL-72."

A post-treatment solution was prepared by diluting Versa-TL-72 with water to a concentration of 3.0% PSSA. No crosslinking agent was used in these examples. Three membranes, all rated 0.45 microns and described above, were dipped and cured at about 125° C. for 20 minutes. In the test procedure, after the WFR test, which serves as a 100 ml flush, the same disc was used for the MB dye capacity test. Results:

|  | Example No. | | |
| --- | --- | --- | --- |
|  | 26 | 27 | 28 |
| Base Membrane | A PS on PE | D PES | N Nylon |
| WFR, sec per 100 ml | 650+ | 35 | 108 |
| WBP, psi | 36 | 36 | 46 |
| MB Dye Capacity, ml | 1 | 1.5 | 1 |

This treatment is only marginally useful. On exposure to water, the membranes pores become clogged by swollen PSSA. On forced flushing with water, the active anionic agent is washed out (judging from the MB results).

EXAMPLES 29 TO 32

Examples 29 to 31 demonstrate the failure to obtain a useful product with PSSA even with an added epoxy crosslinking agent: 1, 4-butanedioldigycidyl ether, BDDGE, commercially available from Aldrich Chemical Co. Since the epoxy resin is not soluble in water, alcohols (or other organics) are necessary cosolvents. A post-treatment solution was prepared containing: 3.5% PSSA, 1.2% BDDGE, 14% IPA, and 14% methanol, and the balance water.

The three preceding base membranes A, D and N were post-treated with the PSSA Epoxy formulation and baked at about 125° C. for 20 minutes in Examples 29 to 31. For comparison, as a control, the nylon membrane was not dip treated but was baked. (Previous control base membranes were not baked.) Tests were performed as per Examples 26 to 28. Results:

|  | Example No. | | | |
| --- | --- | --- | --- | --- |
|  | 29 | 30 | 31 | 32 |
| Base Membrane | A PS on PE | D PES | N Nylon | N Nylon Control |
| WFR, sec per 100 ml | >800 | 565 | No Flow | 35.5 |
| WBP, psi | 39 | 35 | >60 | 43 |
| MB Dye Capacity, ml | No Flow | 1 | No Flow | 1 |

The epoxy resin did not improve the performance of the membrane beyond a similar treatment without the epoxy; it merely clogged the pores more effectively. Post-treatments with PSSA, either alone or with an epoxy crosslinking agent, do not seem to produce useful, anionic, strongly acidic, microporous membranes.

Having described the invention, the embodiments of the invention in which an exclusive property or privilege is claimed are defined as follows:

1. A copolymer solute in a solution for post-treatment of the internal pores of a microporous base membrane comprising a crosslinkable acid copolymer of a strong acid monomer which is an acrylamide alkane sulfonic acid monomer having the formula:

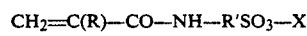

$CH_2=C(R)-CO-NH-R'SO_3-X$ where

R is hydrogen or a lower alkyl or phenyl group;

R' is a methylene group or a lower alkyl, lower cycloalkyl, aromatic, or bivalent hydrocarbon group or other bridging group having its valence bonds on different carbon atoms; and X is hydrogen or sodium, ammonium, organic amine or other salt forming atom or compound, and a crosslinkable monomer having hydroxyl crosslinking functionality selected from (1) N-methylolacrylamide alkoxyether compounds and (2) N-methylolacrylamide, hydroxyalkyl acrylates, and hydroxyalkyl methacrylates that are crosslinkable by reaction with aminoplast resins.

2. An acid copolymer according to claim where the acid monomer is selected from 2-acrylamido-2-methyl-1-propanesulfonic acid, 2-acrylamido-1-propanesulfonic acid, 3-acrylamido-3-butanesulfonic acid, 2-acrylamido-1-ethanesulfonic acid, 3-acrylamido-1-pentanesulfonic acid, and the like.

3. An acid copolymer according to claim 1 where the acid monomer is 2-acrylamido-2-methyl-1-propanesulfonic acid.

4. An acid copolymer according to claim 1 where the crosslinkable monomer is selected from N-(isobutoxymethyl)acrylamide, 2-hydroxyethyl methacrylate, 2-hydroxyethyl acrylate, 2-hydroxypropyl methacrylate, 2-hydroxypropyl acrylate, 3-hydroxypropyl methacrylate, and 3-hydroxypropyl acrylate.

5. An acid polymer according to claim 1 where the crosslinkable monomer comprises N-(isobutoxymethyl)acrylamide.

6. A process of preparing a crosslinkable acid copolymer for post-treatment of the internal pores of a porous membrane, which comprises
reacting an acrylamide alkane sulfonic acid monomer having the formula:

$$CH_2=C(R)-CO-NH-R'-SO_3-X$$

where
R is hydrogen or a lower alkyl or phenyl group;
R' is a methylene group or a lower alkyl, lower cycloalkyl, aromatic, or bivalent hydrocarbon group or other bridging group having its valence bonds on different carbon atoms; and
X is hydrogen or sodium, ammonium, organic amine or other salt forming atom or compound, with a crosslinkable monomer having hydroxyl crosslinking functionality selected from (1) N-methylolacrylamide alkoxyether compounds and (2) N-methylolacrylamide, hydroxyalkyl acrylates, and hydroxyalkyl methacrylates that are crosslinkable by reaction with aminoplast resins and curing and drying the resulting copolymer; and
diluting the copolymer with a solvent.

7. A process according to claim 6 where the amount of crosslinkable monomer in the copolymer is such that the crosslinked network in the resulting copolymer is strong and water resistant after drying without becoming brittle.

8. A process according to claim 6 where an aminoplast resin external crosslinking agent is used in the reaction.

9. A process according to claim 8 where the external crosslinking agent comprises a melamine-formaldehyde resin.

10. A strongly acidic charge modified microporous filter membrane comprising a base membrane having an internal microstructure throughout said base membrane comprising by post-treatment a charge modifying amount of a charge modifying agent bonded by drying and curing from a solvent to substantially all of said base membrane internal microstructure without substantial pore size reduction or pore blockage wherein the charge modifying agent is a crosslinked acid copolymer of a strong acid monomer which is an acrylamide alkane sulfonic acid monomer having the formula:

$$CH_2=C(R)-CO-NH-R'-SO_3-X$$

where
R is hydrogen or a lower alkyl or phenyl group;
R' is a methylene group or a lower alkyl, lower cycloalkyl, aromatic, or bivalent hydrocarbon group or other bridging group having its valence bonds on different carbon atoms; and
X is hydrogen or sodium, ammonium, organic amine or other salt forming atom or compound, with a crosslinkable monomer having hydroxyl crosslinking functionality selected from (1) N-methylolacrylamide alkoxyether compounds and (2) N-methylolacrylamide, hydroxyalkyl acrylates, and hydroxyalkyl methacrylates that are crosslinkable by reaction with aminoplast resins.

11. A charge modified microporous filter membrane according to claim 10 where the crosslinked copolymer comprises a monomer selected from 2-acrylamido-2-methyl-1-propanesulfonic acid, 2-acrylamido-1-propanesulfonic acid, 3-acrylamido-3-butanesulfonic acid, 2-acrylamido-1-ethanesulfonic acid, 3-acrylamido-1-pentanesulfonic acid, and the like.

12. A charge modified microporous filter membrane according to claim 10 where the acid monomer comprises 2-acrylamido-2-methyl-1-propanesulfonic acid.

13. A charge modified microporous filter membrane according to claim 10 where the crosslinked copolymer comprises a monomer selected from N-(isobutoxymethyl)acrylamide, 2-hydroxyethyl methacrylate, 2-hydroxyethyl acrylate, 2-hydroxypropyl methacrylate, 2-hydroxypropyl acrylate, 3-hydroxypropyl methacrylate, 3-hydroxypropyl acrylate, and the like.

14. A charge modified microporous filter membrane according to claim 10 where the crosslinked copolymer comprises N-(isobutoxymethyl)acrylamide.

15. A charge modified microporous filter membrane according to claim 10 where the base membrane comprises a polyethersulfone membrane.

16. A charge modified microporous filter membrane according to claim 10 where the base membrane comprises a polysulfone membrane.

17. A process for preparing a charge modified microporous filter membrane, comprising:
post-treating a microporous base membrane with a dilute solution of an acid charge modifying copolymer according to claim 1 in a solvent medium that is compatible with the base membrane so that the solution contacts the base membrane and fills the internal pores thereof, the copolymer concentration being such as not to block said pores upon drying and curing;
removing the solvent from the thus treated membrane; and
curing the solvent-free membrane at elevated temperature sufficient to achieve bonding of the charge modifying copolymer to the base membrane.

18. A process according to claim 17 where the solution comprises a copolymer of 2-acrylamido-2-methyl-1-propanesulfonic acid.

19. A process according to claim 17 where the solution comprises a copolymer of N-(isobutoxymethyl) acrylamide.

20. A process according to claim 17 where the solution comprises a copolymer of 2-hydroxyethyl methacrylate and a separate crosslinking agent capable of reacting with hydroxyls.

21. A process according to claim 20 where the crosslinking agent is an aminoplast resin.

22. A process according to claim 17 where the base membrane comprises a polyethersulfone polymer.

23. A process according to claim 17 where the base membrane comprises a polysulfone polymer.

24. A membrane post-treatment solution of a crosslinkable acid copolymer prepared in a reaction according to claim 6 in a solvent for said monomer, copolymer and aminoplast resins.

25. A copolymer solution according to claim 24 comprising a solvent selected from water, dimethylformamide, and lower alcohols.

26. A copolymer solution according to claim 24 where the concentration of monomers of said copolymer in the total reaction solution is between about 4 and 17% by weight.

* * * * *

UNITED STATES PATENT AND TRADEMARK OFFICE
CERTIFICATE OF CORRECTION

PATENT NO. : 5,021,160
DATED : June 4, 1991
INVENTOR(S) : Wolpert

It is certified that error appears in the above-identified patent and that said Letters Patent is hereby corrected as shown below:

Column 20, line 51, "claim" should be --claim 1--.

Signed and Sealed this

Twenty-seventh Day of October, 1992

Attest:

DOUGLAS B. COMER

*Attesting Officer*    *Acting Commissioner of Patents and Trademarks*